STEREOPHONIC AMPLIFIER

Filed Oct. 31, 1962

INVENTOR
*HEIN VAN DEN KERCKHOFF*

BY Frank R. Jifani
AGENT 3,177,289

STEREOPHONIC AMPLIFIER

Hein van den Kerckhoff, Emmasingel, Eindhoven, Netherlands, assignor to North American Phillips Company, Inc., New York, N.Y., a corporation of Delaware Filed Oct. 31, 1962, Ser. No. 234,332
Claims priority, application Netherlands Nov. 3, 1961, 270,997
6 Claims. (Cl. 179—1)

The invention relates to a circuit which may be used either for the separate amplification of two sound signals in two channels or for the amplification of a single signal in one channel and the amplification of the same signal in modified form in the other channel.

An important use of such arrangements is in the reproduction of stereophonic sounds wherein the circuit may alternatively be employed to amplify a single sound signal. An analogous arrangement may also be used, however, with the recording of sound, while preferably, but not necessarily the modification of one signal produces a reverberation effect .

Hitherto, arrangements of the kind mentioned in the preamble are constructed so that the modification device, which for the sake of briefness and clarity will be referred to hereinafter as reverberation unit, is connected to the signal input. This results in the disadvantage that signal modification devices, in particular artificial reverberation devices, require a comparatively high input energy level. To this end, it was necessary to provide a pre-amplifier before the reverberation unit, while, as experience has shown, the output signal was generally so weak that a pre-amplifier was also required before the signal could be supplied to a normal pre-amplifier, for example, for sound reproduction.

The invention provides in the first place a simplification of such a circuit arrangement, in which the use of a pre-amplifier before the reverberation unit is unnecessary.

To this end, according to the invention, steps are taken to ensure that the input of the reverberation unit can be connected to the output of the amplifier for the non-modified signal.

In arrangements in which two sound channels are used, in particular in the case of stereophonic reproduction, the amplifiers of the two channels are generally provided with mechanically coupled volume controls, so that the output energy ratio between the two amplifiers may be controlled by means of one knob. In general, reference is made to these coupled volume controls as the balance control.

According to a further embodiment, the invention provides a simple solution of the problem that the same balance control can be used not only in the case of the use of two channels for the adjustment of the energy ratio between the two channels, but also for the adjustment of the ratio between direct and modified sound.

According to the invention this result is achieved by constructing the circuit so that the part of the balance control for the first channel is switched out of circuit while the part for the second channel is switched into circuit.

When, as is usual, each of the amplifiers is provided with a tone control and/or a volume control, and the controls are mechanically coupled, the difficulty arises that the modified sound is subjected two times in succession to each type of control, so that the modified sound is subjected to the square of the control function. This is very undesirable. In order to obviate this difficulty, according to a further aspect of the invention, provisions are made to ensure that, when the arrangement is switched over to modified sound, the tone control and the volume control of the amplifier of the second channel are disabled.

This yields an important additional advantage. In many cases, the tone control will be a device which decreases the amplification of the amplifier concerned. This arrangement has the advantage that it guarantees a better linearity of the amplification. If this tone control is switched out of circuit, the amplification is consequently raised, resulting in a certain degree of distortion. As experience has shown, however, this distortion is admissible for the modified sound, in particular for the reverberation unit. Moreover, the first direct channel can then be controlled by means of its own tone and volume control, while the second channel can be controlled by means of the balance control. The amplifier between the output of the reverberation unit and the input of the so-called output amplifier can be of a very simple construction, such as a single transistor amplifier.

The invention will now be described more fully with reference to the accompanying drawing, in which.

Figure 1:
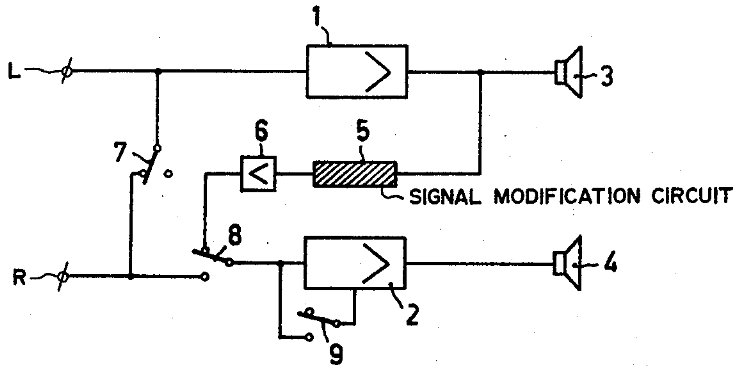
FIG. 1 is a block diagram of the invention.

In FIG. 1, L and R denote two sound channels each comprising an amplifier 1 and 2, respectively, and an output 3 and 4, respectively, shown in the drawing as loudspeakers. A connection extends from the output of the amplifier 1 to the modification device 5 and from this device to a power amplifier 6.

In the diagram of FIG. 1 it is assumed that the signal to be reproduced directly and in modified form may be supplied both through the line L and the line R, or may be a mixed signal of the signals supplied through these two lines. Of course, it is also possible that this direct signal is always supplied to, for example, the line L. The switches 7, 8 and 9 are shown in the positions in which one signal is reproduced directly through loudspeaker 3 and in a modified form through loudspeaker 4. The switch 9 interrupts the negative feedback circuit of the amplifier 2, so that the amplification factor of this amplifier is raised when this switch is opened.

Figure 2:
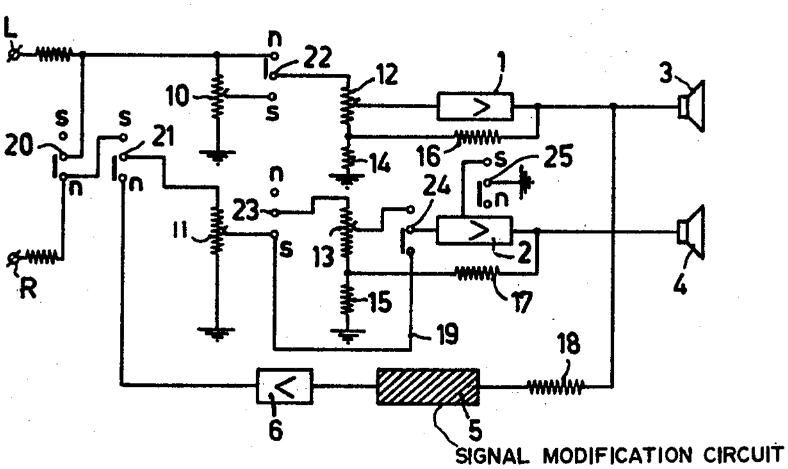
FIG. 2 is a schematic diagram of a circuit according to the invention.

FIG. 2, in which the references L, R and 1 to 6 have the same meaning as in FIG. 1, shows a typical circuit according to the invention. This embodiment comprises a plurality of mechanically coupled single pole double throw switches 20, 21, 22, 23, 24 and 25. The central contact of each of these switches is connected to the respective contact *s* when the two signals are to be amplified separately, e.g. for stereophonic reproduction, and to the contact *n* when the same signal is to be reproduced directly and in modified form (e.g. for reverberation effects). The contacts are shown in the positions corresponding to reproduction with reverberation.

When the circuit is adjusted for stereophonic reproduction, the two channels are completely separated, the two balance potentiometers 10 and 11 are normally operative just like the volume controls 12 and 13 and the tone controls (not shown). A negative feedback network 16 and 17, respectively, to 14 and 15, respectively, provides a frequency dependent negative feedback. In each of the amplifiers 1 and 2, provision is also made of a normal connection of possible tone correction means for high and low tones, respectively. The signals supplied at L and R, respectively, are normally amplified and are reproduced separately at 3 and 4, respectively. The relative strength of the signals emanating at 3 and 4 is controlled by means of the mechanically coupled balance potentiometers 10 and 11.

If the arrangement is now changed over to modified sound, to provide a reverberation effect, the switch 20 interconnects the inputs of the two channels. If in such a case only one signal is supplied, for example at the channel L, the switch 20 is of course superfluous.

The switch 21 interrupts the connection between the input of R and the upper end of potentiometer 11 and establishes a connection to the output of the pre-amplifier 6 which receives the signal of loudspeaker through a matching impedance 18 and the reverberation unit. The switch 22 doubles the balance potentiometer 10 and switch 23 interrupts the connection between the sliding contact of potentiometer 11 and the upper end of potentiometer 13. However, since the switch 24 directly connects the sliding contact of potentiometer 11 to the input of the amplifier 2, potentiometer 11 remains operative for the control of the amplifier 2. The switch 24 interrupts the connection to the sliding contact of potentiometer 13. Finally, the switch 25 interrupts the ground connection of a filter.

In the reverberation position, the switch 24 interrups the negative feedback circuit of the amplifier 2 and the sliding contact of potentiometer 13 has no control on the amplifier. Consequently, the amplifier is now controlled by means of potentiometer 12 without potentiometer 10 being involved, and the amplifier 2 is controlled by means of potentiometer 11 without potentiometer 13 playing a part. The direct sound and consequently also the input sound for the reverberation unit 5 are still subjected to the volume control of potentiometer 12. However, the amplication of amplifier 2 has decreased considerably, as a result of which the power amplifier 6 can be of a very simple construction, for example in the form of a single transistor amplifier. Moreover, with this circuit arrangement the same knob that balances the two channels with respect to each other, in stereophonic reproduction with respect to each other, is used to balance the modified sound with respect to the direct sound when the circuit is used to amplify a single signal. The knobs for tone control and volume control have the same functions in both applications of the circuit.

What is claimed is:

1. A signal amplifier system comprising first and second amplifier channels each having an input circuit and an output circuit, first and second signal input terminals, signal modification circuit means having an input circuit and an output circuit, means connecting the output circuit of said first channel to the input circuit of said modification circuit means, first and second mechanically coupled balance potentiometer means, first and second mechanically coupled volume control means, means connecting said first balance potentiometer means and said first volume control means between said first terminal and the input circuit of said first channel, means connecting said second balance potentiometer means and said second volume control means between said second terminal and the input circuit of said second channel, whereby signals applied to said first and second terminals are separately amplified in said first and second channels respectively, and switch means connected to selectively simultaneously disconnect said first balance potentiometer means and said second volume control means, and connect said second balance potentiometer means between the output circuit of said modification circuit means and the input circuit of said second channel, whereby signals applied to said first terminal are amplified directly in said first channel and in modified form in said second channel.

2. A signal amplifier system comprising first and second amplifier channels each having an input circuit and an output circuit, first and second signal input terminals, signal modification circuit means having an input circuit and an output circuit, means connecting the output circuit of said first channel to the input circuit of said signal modification circuit means, first and second potentiometers having their movable arms mechanically coupled, third and fourth potentiometers having their movable arms mechanically coupled, means connecting said first and second terminals to said first and second potentiometers respectively, means connecting the arms of said first and second potentiometers to said third and fourth potentiometers respectively, means connecting the arms of said third and fourth potentiometers to the input circuits of said first and second amplifier channels respectively, whereby signals applied to said first and second terminals are separately amplified in said first and second channels respectively, and switch means connected to substantially simultaneously bypass signals around one of said first and third potentiometers and the remaining potentiometer not mechanically coupled thereto, and to connect the output of said modification circuit to the potentiometer mechanically coupled to said one potentiometer, whereby signals applied to said first terminal are directly amplified in said first channel and are amplified in said second channel after passing through said modification circuit means.

3. A signal amplifier system comprising first and second amplifier channels each having an input circuit and an output circuit, first and second signal input terminals, signal modification circuit means having an input circuit and an output circuit, means connecting the output circuit of said first channel to the input circuit of said signal modification circuit means, first and second potentiometers having their movable arms mechanically coupled, third and fourth potentiometers having their movable arms mechanically coupled, means connecting said first and second terminals to said first and second potentiometers respectively, means connecting the arms of said first and second potentiometers to said third and fourth potentiometers respectively, means connecting the arms of said third and fourth potentiometers to the input circuits of said first and second amplifier channels respectively, whereby signals applied to said first and second terminals are separately amplified in said first and second channels respectively, said first and second potentiometers comprising a balance control and said third and fourth potentiometers comprising a volume control, and switch means connected for substantially simultaneously connecting said first terminal to said third potentiometer, for connecting said arm of said second potentiometer to the input circuit of said second channel, and for connecting the output circuit of said modification circuit means to said second potentiometer, whereby signals applied to said first terminal are amplified directly in said first channel and are amplified in said second channel after passing through said modification circuit means.

4. The amplifier system of claim 3 wherein said second channel comprises negative feedback means, comprising means for disconnecting said negative feedback means when said first terminal is connected to said third potentiometer.

5. The amplifier system of claim 3 wherein said second channel comprises tone correction means, comprising means for disconnecting said tone correction means when said first terminal is connected to said third potentiometer.

6. A signal amplifier system comprising first and second amplifier channels, each having an input circuit and an output circuit, first and second signal input terminals, signal modification circuit means having an input circuit and an output circuit, means connecting the output circuit of said first channel to the input circuit of said signal modification means, first and second balance potentiometers having mechanically coupled movable arms, third and fourth volume control potentiometers having mechanically coupled movable arms, first, second, third and fourth mechanically coupled switch means each having a movable contact and first and second fixed contacts, means connecting said first input terminal to one end of said first potentiometer and the second fixed contact of said first switch means, means connecting the first fixed contact of said first switch means to the movable arm of said first potentiometer, means connecting the movable contact of said first switch means to one end of said third potentiometer, means connecting the movable arm of said third potentiometer to the input circuit of said first channel, means connecting the first and second fixed contacts of said second switch means to said second input terminal and the output circuit of said modification means respectively, means connecting the movable contact of said second switch means to one end of said second potentiometer, means connecting the first and second fixed contacts of said third switch means to the arm of said third and second potentiometers respectively, means connecting the movable contacts of said third and fourth potentiometers to the input circuit of said second channel and one end of said fourth potentiometer respectively, and means connecting the first fixed contact of said fourth switch means to the arm of said third potentiometer.

References Cited by the Examiner

UNITED STATES PATENTS

| | | | |
|---|---|---|---|
| 2,978,543 | 4/61 | Kennedy | 179—1 |
| 3,071,648 | 1/63 | Scott | 179—1 |
| 3,079,463 | 2/63 | Fieldman | 179—1 |

ROBERT H. ROSE, *Primary Examiner.*